US005635130A

United States Patent [19]
Leczo et al.

[11] Patent Number: 5,635,130
[45] Date of Patent: Jun. 3, 1997

[54] COMBINED OXYGEN BLOWING/FUEL BURNER LANCE ASSEMBLY

[75] Inventors: Theodore J. Leczo, Pittsburgh; Nicholas M. Rymarchyk, Jr., Baden; Gerald R. Glatz, Pittsburgh, all of Pa.

[73] Assignee: Berry Metal Co., Harmony, Pa.

[21] Appl. No.: 485,306

[22] Filed: Jun. 7, 1995

[51] Int. Cl.$^6$ .................................................. C22B 15/00
[52] U.S. Cl. ........................ 266/47; 266/48; 266/225; 266/265
[58] Field of Search ........................ 266/47, 48, 225, 266/226, 265

[56] References Cited

U.S. PATENT DOCUMENTS

| Re. 28,769 | 4/1976 | Rymarchyk et al. | 266/225 |
|---|---|---|---|
| 3,620,455 | 11/1971 | Berry | 266/225 |
| 3,823,929 | 7/1974 | Rymarchyk et al. | 266/225 |
| 3,827,632 | 8/1974 | Rymarchyk et al. | 266/225 |
| 3,912,243 | 10/1975 | Chang | 266/226 |
| 4,047,936 | 9/1977 | Chang | 266/226 |
| 4,083,540 | 4/1978 | Berry et al. | 266/225 |
| 4,434,005 | 2/1984 | Metz et al. | 266/225 |
| 4,653,730 | 3/1987 | Wunsche et al. | 266/47 |
| 5,366,537 | 11/1994 | Schlichting | 266/225 |

FOREIGN PATENT DOCUMENTS

| 0046349 | 3/1985 | Japan | 266/225 |
|---|---|---|---|
| 0056009 | 4/1985 | Japan | 266/225 |

OTHER PUBLICATIONS

EMPCO Brochure, UNILANCE Process Intensification System May 14, 1986.

*Primary Examiner*—Scott Kastler
*Attorney, Agent, or Firm*—Reed, Smith, Shaw & McClay

[57] ABSTRACT

An improved oxygen blowing/fuel burner lance assembly for introducing, at selected times, a flow of oxygen and/or carbonaceous fuel material, such as fine-grained carbon or hydrocarbon gas (e.g., natural gas and the like), into an electric furnace vessel. The lance assembly includes a housing portion, a straight barrel having a first and connected to the housing portion and a second end connected to a lance tip. The lance tip includes a nozzle structure having at least one oxygen injection nozzle and at least one carbonaceous material injection nozzle which together define a burner assembly for dispensing a combined flow of carbonaceous fuel and oxygen from the lance which may be ignited to produce a flame for preheating a scrap charge in an electric furnace vessel. When the scrap is sufficiently melted through cooperation of the electric furnace electrodes and the burner, the oxygen and carbonaceous fuel material flows may be terminated to extinguish the burner flame, the oxygen flow may be restarted at a reduced flow rate to complete preheating/cutting (if necessary), or at a supersonic flow rate for refining/decarburizing of the molten steel bath.

5 Claims, 2 Drawing Sheets

COMBINED OXYGEN BLOWING/FUEL BURNER LANCE ASSEMBLY

FIELD OF THE INVENTION

The present invention relates in general to steelmaking systems and methods and, more particularly, to a combined oxygen blowing/fuel burner lance assembly for use in high temperature electric furnaces.

BACKGROUND OF THE INVENTION

In the art of steelmaking, oxygen lance assemblies have long been used to increase the productive capacity of electric arc furnaces or, simply, "electric furnaces" through the introduction of oxygen at high velocity directly against the molten bath. The nozzle structure of such a lance assembly oftentimes includes an oxygen nozzle and a nozzle for introducing a flow of fine-grain solid material in a form of a metallurgical agent, such as carbon, lime, and/or other metallurgical agents of many forms, for further enhancement of the steelmaking process dependent on desired results.

One objective in attempting to improve the performance of an electric furnace is to cause an increase in the volume of the slag that normally forms on the surface of the molten steel bath. A high slag volume increases the thermal efficiency of the electric furnace in that the slag functions as an insulating layer that preserves the temperature of the bath. Moreover, the slag combines with and removes impurities from the bath. For these reasons, it is desirable to provide a lance assembly capable of delivering oxygen and carbon or other fine-grain solids in a manner to increase volume of the slag and to attain beneficial thermal and chemical reactions for increasing productive capacity.

Oxygen blowing lances have been used in connection with electric furnace steelmaking vessels both to perform their primary function of refining/decarburizing of the metal bath and to provide an additional source of energy to augment "cutting" or melting of the scrap charge by the vessels' electrodes.

When using a conventional straight-barreled oxygen blowing lance in an electric furnace steelmaking vessel, the lance is inserted through a lance opening provided in the sidewall of the vessel. Typically, the lance is inclined and the angle of insertion of the lance ranges from about 20 to 40 degrees with respect to horizontal. In operation, oxygen is injected from the lance immediately after the vessel has been provided with the first bucket charge of scrap and after the lance opening has been cleared of cold scrap. Although the oxygen impingement upon the cold scrap produces little or no meaningful thermochemical reaction between the oxygen flow and the scrap, it frequently results in secondary combustion at the furnace roof and duct areas, thereby causing excessive exhaust temperatures and decreased service life of the vessel components at these sites. After charging with the second and third buckets of scrap, however, there is sufficient latent heat within the vessel to provide oxygen ignition temperatures within the mass of scrap. Nevertheless, scrap cutting using a conventional oxygen blowing lance as a supplemental energy source remains slow and inefficient.

To supplement the preheating and scrap cutting effect of an oxygen lance in an electric furnace, it has been proposed to insert one or more oxygen/fuel burner assemblies, along with the lance, into the steelmaking vessel. Because of the bulk of equipment, however, such an arrangement necessitates operation through an opened slag removal door. Consequently, the available preheating/scrap cutting area is limited and air entrainment occurs within the vessel which is detrimental to the production of low nitrogen steel grades.

U.S. Pat. No. 4,653,730 discloses a system that incorporates a fuel burner into an oxygen blowing lance. The lance is of arcuate design and is introduced through a lance opening in the furnace sidewall. Because if its arcuate shape, the lance travels in an arcuate path, thereby limiting the distance from the furnace sidewall that the lance can be inserted into the furnace to considerably less than the radius of curvature of the lance and well short of the central regions of the vessel. Accordingly, the operating area of the lance is limited to an area close to the sidewall of the furnace vessel. This localized operating area can result in over-oxidation of scrap and furnace sidewall erosion in the vicinity of the lance. Moreover, to achieve any meaningful distribution of lance-provided energy throughout the scrap charge, U.S. Pat. No. 4,653,730 suggests that a plurality of such lances (e.g., three) be disposed about the circumference of the furnace vessel, thereby multiplying the acquisition and operation costs associated with lance usage.

U.S. Pat. Nos. 3,620,455, 3,823,929, Re. 28,769, 3,827, 632, 3,912,243 and 4,047,936 describe lance apparatus including straight-barreled lances having combined fuel burning and oxygen blowing capability. These assemblies are generally effective for their prescribed functions. However, none of these lances are operable to provide, in addition to their oxygen blowing and scrap melting functions, the selective introduction of metallurgical agents such as particulate carbon to enhance the effectiveness of the refining process and ultimate quality of the steel products. U.S. Pat. No. 4,083,540 provides for a oxygen/fuel burner lance assembly without a capability to deliver metallurgical agents during refining. U.S. Pat. No. 4,434,005 describes a steelmaking lance having post-combustion and carbon injection functions but without a fuel burner capability.

An advantage exists, therefore, for a single combined oxygen blowing/fuel burner lance assembly capable of providing the benefits of rapid and generalized preheating and cutting of the scrap charge within an electric furnace while avoiding the diseconomies of multiple lances and the potential harm that may be caused to the scrap and the vessel in the vicinity of the vessel sidewall.

A further advantage exists for such a lance assembly which is additionally capable of introducing, at selected times, a metallurgical agent such as fine-grained carbon or the like, for promoting slag formation and desired end-point chemistry qualities in the molten bath.

SUMMARY OF THE INVENTION

The present invention provides an improved oxygen blowing/fuel burner lance assembly for introducing, at selected times, a flow of oxygen and/or carbonaceous fuel material, such as fine-grained carbon or hydrocarbon gas (e.g., natural gas and the like), into an electric furnace vessel.

The lance assembly includes a housing portion, a straight barrel having a first end connected to the housing portion and a second end connected to a lance tip. The lance assembly is adapted for insertion through a lance opening in the sidewall of a furnace vessel (such as, for example, an electric furnace vessel) at an acute angle with respect to horizontal. The housing portion is attachable to conventional lance support and insertion equipment and includes separate inlets adapted for respective connection to a source of carbonaceous fuel material, a source of oxygen and a source of recirculating coolant fluid such as water. The housing portion further includes a coolant fluid outlet for returning heated coolant fluid from the lance to the coolant fluid source.

The lance tip includes a nozzle structure having an oxygen discharge port which diverges outwardly at an acute angle with respect to the central axis of the lance barrel. The nozzle structure further comprises carbonaceous fuel discharge port means for dispensing a flow of carbonaceous fuel from the lance when the lance assembly functions in its burner mode. The lance assembly further includes substantially concentric conduits forming a plurality passages for delivering fluid from the several inlets to the lance tip: one passage fluidly connecting the carbonaceous fuel inlet to the carbonaceous fuel discharge port means, another passage fluidly connecting the oxygen inlet with the oxygen discharge port, and another passage defining inlet and outlet chambers for fluidly connecting the coolant fluid inlet with the coolant fluid outlet so as to permit a flow of coolant fluid through the lance assembly during operation.

In accordance with a presently preferred embodiment, the lance housing includes an additional inlet adapted for connection, via suitable hardware and valving components, to the same or a different source of oxygen as that mentioned above, and the lance tip nozzle structure includes an additional oxygen discharge port. The lance assembly, in turn, includes an additional conduit defining an additional oxygen flow passage that is isolated from communication with the aforementioned passages for fluidly communicating the additional oxygen inlet with the additional oxygen outlet port. The carbonaceous fuel discharge port means is also preferably disposed substantially coaxially with the central axis of the lance barrel to dispense a flow of carbonaceous fuel which cooperates with a flow of oxygen from the additional oxygen port rather than the flow from outwardly divergent oxygen discharge port. As such, the additional oxygen discharge port and the carbonaceous fuel discharge port means produce a burner assembly that is substantially coaxial with the central axis of the lance barrel. When their cooperating flows of oxygen and carbonaceous fuel are ignited, the burner flame thus created produces a focused flame that operates to preheat and cut the charge of scrap contained within the furnace vessel. When the scrap is sufficiently melted through cooperation of the electric furnace electrodes and the burner, the oxygen and carbonaceous fuel material flows may be terminated to extinguish the burner flame, and the oxygen flow through the additional oxygen outlet port may be restarted at a reduced flow rate to complete preheating/cutting (if necessary).

During and/or after operation of the burner, a flow of oxygen may be dispensed as needed from the divergent oxygen discharge port. And, after burning is completed and the burner flame is extinguished, both oxygen discharge ports may be operated to inject supersonic flows of oxygen gas for refining/decarburization of the steel bath.

Further, the source of carbonaceous fuel may be a supply of hydrocarbon gas such as natural gas and/or particulate matter such as fine-grained carbon suspended within a suitable carrier stream gas.

An operator may control the lance assembly such that oxygen is dispensed from the divergent oxygen discharge port, particulate carbon is dispensed from the carbonaceous fuel port means, and no oxygen is dispensed from the additional oxygen discharge port. Under these circumstances, the oxygen is delivered to the slag layer from the divergent oxygen discharge port at a supersonic flow rate with sufficient penetrating force to form a surface wave pattern and an emulsified spray of slag. The wave pattern resulting from the impact of the oxygen reduces temperature stratification in the bath and homogenizes the molten metal. Excess oxygen from the dimple formed at the penetration area in the slag spreads to combine with the injected carbon and form carbon monoxide and then carbon dioxide. The "foaming" condition of the slag along with the chemical reaction between the excess oxygen and carbon increases electrical efficiency between the electrodes of the electric furnace and the molten steel bath. In addition, the mass of slag and the chemical action of the oxygen and carbon functions to combine with impurities in the bath and insures capture of silicon oxide, phosphorus and the like for a more pure steel product.

The design of the lance assembly of the invention attains highly effective preheating and scrap cutting results because the oxygen and carbonaceous fuel are injected with precision at a centralized area of the furnace during use. Consequently, a single, straight-barreled lance assembly is provided which performs comparably to a plurality of combined oxygen blowing/fuel burner lance assemblies of arcuate construction. In addition, the ability of the present lance assembly to be deeply inserted into central regions of the furnace vessel permits generalized rather than localized heating of the scrap charge while avoiding the potential for over-oxidation of the scrap and damage to the furnace sidewell which may occur when the lance tip is confined to operations proximate the vessel sidewall. Moreover, when using the instant lance assembly as a refinement lance injecting both particulate carbon and oxygen, the carbon and oxygen are introduced into the central area of the furnace in the most reactive zone of the steel bath at close proximity with the delta of the electrodes to insure greater efficiency of the electric furnace.

Other details, objects and advantages of present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments therefor shown, by way of example only, in the accompanying drawings, wherein.

DETAILED DESCRIPTION OF THE INVENTION

Figure 1:
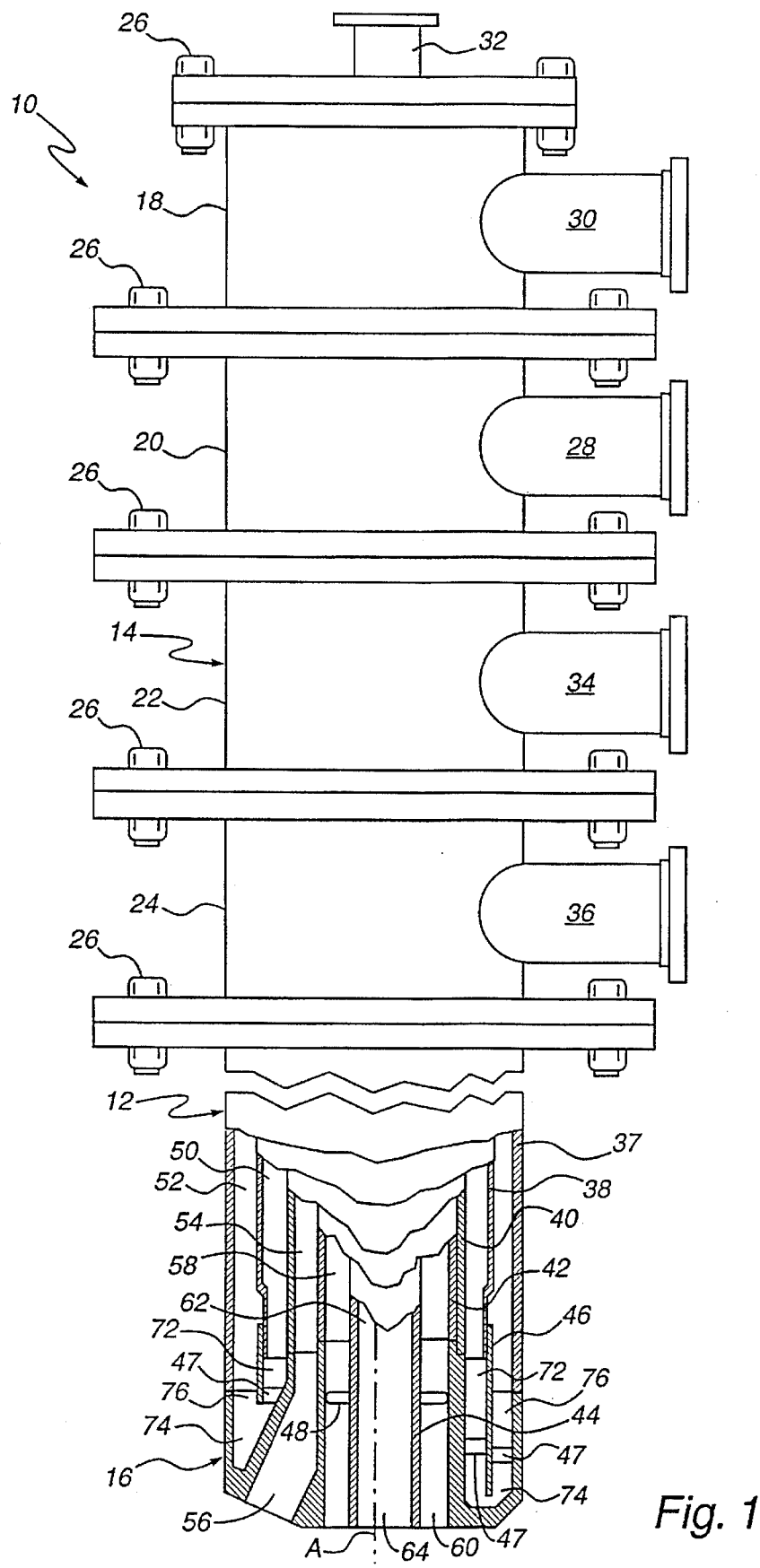
FIG. 1 is an elevational view, in partial section, of a preferred embodiment of the combined oxygen blowing/fuel burner lance assembly of the present invention.

Referring to FIG. 1, there is illustrated a presently preferred embodiment of the combined oxygen blowing/fuel burner lance assembly of the invention, generally designated by reference numeral 10. The lance assembly 10 includes a straight, elongated hollow metal barrel 12 mounted at a first end thereof to a metal housing assembly 14 so as to be in fluid communication therewith. The lance barrel 12 further comprises a lance tip 16 suitably mounted to the free end of the barrel 12 opposite the housing assembly 14. The housing assembly 14 includes a plurality of substantially identical modular housing sections 18, 20, 22 and 24. Each of the housing sections may include a metal cylindrical pipe section having a pair of annular plates mounted by welding at each end. The annular plates form annular radially projecting flanges in which a plurality of bolt holes may be concentrically arranged about the pipe sections in order to facilitate connection of the housing sections to one another by suitable fastener elements such as bolt assemblies 26 in the conventional manner.

Housing section 20 includes an oxygen inlet pipe 28 (hereinafter the "first oxygen inlet pipe") which is but one of two oxygen inlet pipes associated with the housing assembly 14. The first oxygen inlet pipe 28 projects laterally from housing section 20.

Housing section 18 has a laterally extending second oxygen inlet pipe 30 and a carbonaceous fuel inlet pipe 32 projecting from an end thereof. In the known manner, housing section 22 possesses a laterally extending coolant inlet pipe 34 and housing section 24 is provided with a laterally extending coolant outlet pipe 36.

It will be understood that the coolant inlet pipe 34 and coolant outlet pipe 36 are to be connected appropriate intake and return lines of a recirculating coolant (e.g., water) system to afford cooling of the lance assembly during operation as is known in the art. Likewise, carbonaceous fuel inlet pipe 32 is communicable with a suitable source of pressurized carbonaceous fuel. And, the first and second oxygen inlet pipes 28, 30 may be connected to separate sources of pressurized oxygen or a common source of oxygen which, in conjunction with an appropriate valving system (not shown), may be used to independently supply oxygen to the pipes 28, 30 at operator-selected times and pressures.

For simplicity of illustration and brevity of discussion, the reader will appreciate that lance assembly 10 includes suitable sliding seal constructions for isolating the several housing assembly inlet pipes 28, 30, 32, 34 and 36 from fluid communication with one another while permitting relative thermal expansion and contraction among substantially concentric conduits (described below) which together constitute the barrel 12 of lance assembly 10.

Lance barrel 12 is comprised of a plurality of elongated metal pipes 37, 38, 40, 42 and 44. The lower ends of conduits 37, 40 and 42 are continuously welded to separate annular connection sites of the lance tip 16. The lower end of conduit 38 forms a slip joint with a sleeve 46 welded to lance tip 16 via several angularly spaced apart lugs 47. Although not shown in detail, the upper end of conduit 44 communicates with carbonaceous fuel inlet pipe 32 and is maintained in spaced relation from conduit 42 by a plurality of spacers 48 radially outwardly projecting from conduit 44 at selected intervals therealong.

The annular space between conduits 38 and 40 defines a coolant inlet passage 50 which fluidly communicates at its upper end with coolant inlet pipe 34. As described in greater detail hereinafter, the lower end of the coolant inlet passage 50 is in fluid communication with the lower end of an annular coolant outlet passage 52 established between conduits 37 and 38. The upper end of the coolant outlet passage 52 fluidly communicates with coolant outlet pipe 34. Conduit 40 is preferably disposed somewhat eccentrically with respect to conduit 42 to define a substantially semi-annular first oxygen flow passage 54 which is fluidly connected at its upper end to the first oxygen inlet pipe 28 and which terminates at its lower end in a first oxygen injection nozzle 56 provided in lance tip 16. The first oxygen injection nozzle 56 preferably diverges outwardly at an acute angle of approximately 20° to 30° with respect to a central axis "A" of lance barrel 12. The annular space between conduits 42 and 44 defines a second oxygen flow passage 58 fluidly connected at its upper end to the second oxygen inlet pipe 30 and which terminates at its lower end in a second oxygen injection nozzle 60 provided in lance tip 16. Lastly, the upper end of conduit 44 is fluidly connected to the carbonaceous fuel inlet pipe 32 such that the interior of conduit 44 defines a carbonaceous fuel flow passage 62 which terminates at its lower end in a carbonaceous fuel injection nozzle 64.

According to the present invention, lance assembly 10 may be selectively operated to function either as an oxygen blowing lance or as a burner device. More particularly, following charging of an electric furnace vessel with scrap, the lance support insertion equipment (FIG. 2), is operated to insert the lance barrel 12 into the vessel at an acute inclination, e.g., 20° to 30° relative to horizontal, through a suitable lance opening. A flow of oxygen is then established through the second oxygen inlet pipe 30 while a flow of carbonaceous fuel, e.g., hydrocarbon gas such as natural gas or fine-grained carbon suspended by a suitable carrier stream such as compressed air, nitrogen, argon or the like, is establish through the carbonaceous fuel inlet pipe 32. Accordingly, carbonaceous fuel and oxygen combine upon exiting the carbonaceous fuel injection nozzle 64 and the second oxygen injection nozzle 60. That is, the nozzles 60, 64 cooperate to define a burner assembly whose combined oxygen and carbonaceous material discharge flow may be ignited to produce a focused flame useful in augmenting the preheating and scrap cutting effects of the electrodes within the furnace vessel. Following scrap preheating and cutting, the lance assembly 10 may then be used as blowing lance for dispensing a flow of oxygen and, if desired, a separate flow of carbonaceous material, e.g., hydrocarbon fuel or fine-grained solid material such as carbon and the like into the molten steel bath.

Figure 3:
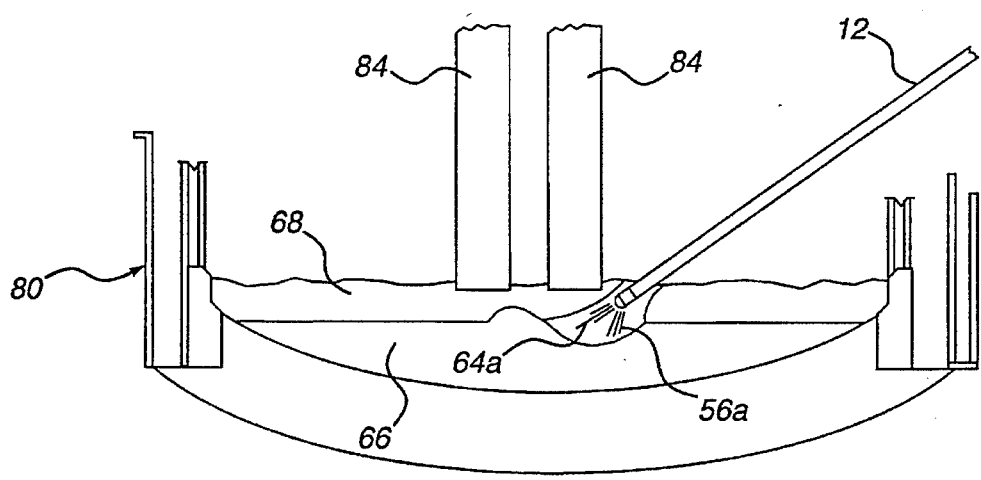
FIG. 3 is view of the lance assembly of FIG. 1 substantially fully inserted into an electric furnace vessel.

More particularly, a flow of hydrocarbon gas, carbon or other fine-grained solid material useful in the steelmaking process is established through conduit 44 from a conventional source (not shown) for ejection from nozzle 64. Simultaneously, a flow of oxygen is established through the first oxygen flow passage 54 from a source of oxygen (not shown) in communication with first oxygen inlet pipe 28 whereby the first oxygen injection nozzle 56 dispenses the oxygen flow. It is preferred that the flow rate of oxygen through the first oxygen injection nozzle 56 be supersonic and attain a velocity of about Mach 1.5 to about 2.3. As is apparent from FIG. 3, the first oxygen injection nozzle 56 directs oxygen flow 56a outwardly (and downwardly) from the axial direction of the lance assembly 10 whereas the flow of material 64a from the carbonaceous fuel injection nozzle 64 is substantially coaxial with the longitudinal axis of the lance barrel 12 such that the two flows impinge on the molten bath 66 at separate spaced areas of the slag layer 68. During both the fuel burner and blowing lance procedures, a source of coolant such as water is circulated through the lance assembly in a conventional manner.

As mentioned previously, the lower end of the coolant conduit 38 forms a slip joint with a sleeve 46 connected to the lance tip 16 by way of lugs 47. The lance tip 16 is also provided with a coolant inlet 72 in fluid communication with coolant inlet passage 50 and includes a passageway 74 concentrically arranged internally throughout the lance tip 16. An outlet passage 76 is formed in fluid communication with passageway 74 to return coolant through the coolant outlet passage 52.

During all phases of operation a source of coolant such as water is introduced through coolant inlet pipe 34 and downward through the coolant inlet passage 50 between the conduits 38 and 40. The flow of coolant is directed through the lance tip passageway 74 and through passage 76 for introduction into coolant outlet passage 52. The lateral coolant outlet pipe 36 within housing section 24 acts as an outlet for the coolant in a conventional manner. It will be understood that, but for the coolant and outlet passages 50 and 52, all other gaseous fluid and/or solid material transmitting passages of the lance 10 are isolated from communication with one another.

Figure 2:
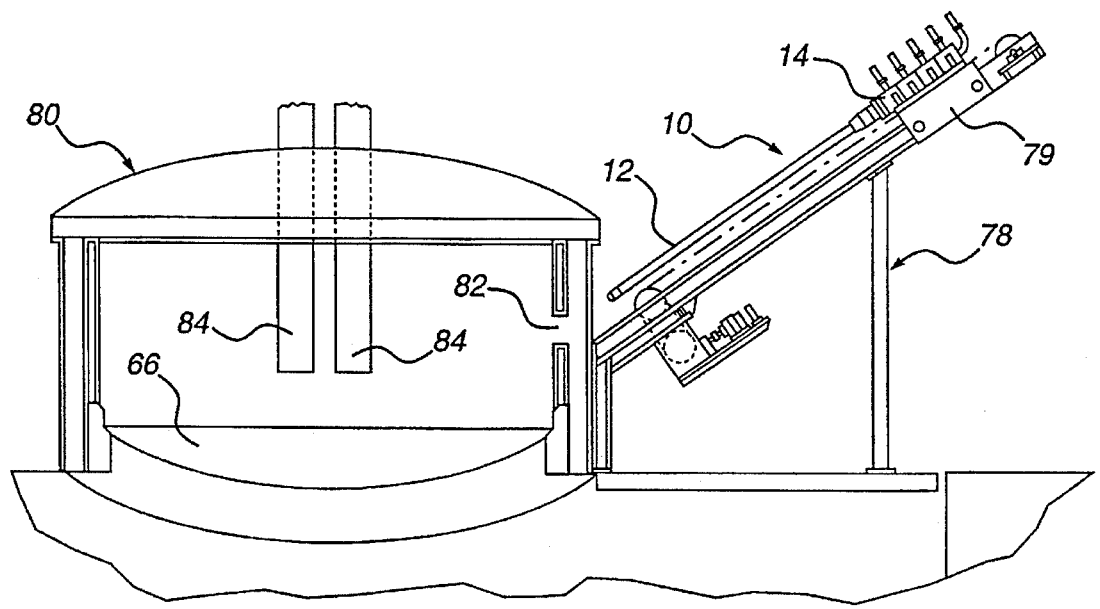
FIG. 2 is a schematic view of an electric furnace generally depicting conventional lance support and insertion equipment that may be used to manipulate the combined oxygen blowing/fuel burner lance assembly of the present invention.

Referring to FIG. 2, there is shown conventional lance support and insertion equipment 78 useful for manipulating the lance assembly described above in relation to an electric furnace 80. Although capable of being used for all phases of operation of the lance assembly 10, the following description refers to the lance support and insertion equipment 78 as such equipment would be deployed when lance assembly 10 is used in its blowing lance mode for refining a molten bath 66. The lance housing assembly 14 is supported by a conventional reciprocable support carriage 79 of lance support and insertion equipment 78 to enable insertion of barrel 12 through a lance opening 82 provided in the electric furnace 80 of conventional design, such as a 100 ton vessel having a plurality, usually three, electrodes 84 (only two of which are shown). The lance barrel 12 is so disposed by equipment 78 that the first oxygen injection nozzle is directed downwardly with respect to carbonaceous fuel injection nozzle. Moreover, the angle of inclination of the lance assembly is approximately 20° to 40° relative to horizontal.

Turning again to FIG. 3, wherein the lance barrel has been substantially fully inserted into vessel 80, the flow of material 64a being ejected from the carbonaceous fuel injection nozzle is thus optimumly disposed at an angle of 20° to 40° with respect to the top of the molten bath 66. The supersonic oxygen flow 56a from the first oxygen injection nozzle is accordingly angularly disposed at angles from about 45° to 65° with respect to the top surface of the molten bath, whereby the flow of the oxygen does not intersect with the flow of the hydrocarbon gas (or carbon) above the surface of the molten bath. The supersonic stream of oxygen impinges upon the slag 68 with deep penetration to create a series of waves throughout the molten bath to promote thermal, physical and chemical bath reactions, but prevents temperature stratification within the bath and homogenizes the molten steel. In addition, excess oxygen striking the slag 68 is released from the impact dimple in the slag and combines with the carbon to create initially carbon monoxide and, thereafter, carbon dioxide for emulsifying the slag into a foam for greater electrical and thermal efficiency and improved metallurgical reactions. The lance assembly 10 thus directs the hydrocarbon fuel or carbon stream to an area generally in the center of the molten bath above which the delta arrangement of electrodes 84 is conventionally positioned. It has been found that superior efficiency can be attained by directing the oxygen flow from first oxygen nozzle to an impact area which is located at a distance approximately one-third of the overall diameter of the molten bath from the furnace vessel wall, a phenomenon which is unattainable by lance assemblies of arcuate shape.

Also, if desired or necessary, in lieu of a flow of carbonaceous material being dispensed from carbonaceous fuel injection nozzle, a flow of oxygen may be discharged from the second oxygen injection nozzle 60 as well as first oxygen injection nozzle 56, preferably at supersonic velocity, to enhance decarburization of the molten steel bath.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A steelmaking lance assembly comprising:
   a straight lance barrel having a central axis and first and second ends;
   a housing attached to said first end of said lance barrel; and
   a lance tip attached to said second end of said lance barrel, said lance tip including an oxygen injection nozzle for injecting oxygen into a steelmaking furnace vessel and at least one carbonaceous material injection nozzle for injecting carbonaceous material into a steelmaking furnace vessel, said oxygen injection nozzle and said at least one carbonaceous material injection nozzle extending substantially parallel to and substantially coaxially with said central axis of said barrel to define a burner assembly from which a combined flow of oxygen and carbonaceous material may be discharged and ignited to produce a focused flame operable to preheat and cut a charge of scrap material within a steelmaking furnace vessel, said lance tip further including an additional oxygen injection nozzle discrete from said burner assembly and extending in a direction outwardly divergent from said central axis of said barrel.

2. The steelmaking lance assembly of claim 1 wherein said additional oxygen injection nozzle outwardly diverges from said central axis at an angle of about 20° to about 30°.

3. The steelmaking lance assembly of claim 1 wherein said barrel includes an oxygen flow passage in communication with said oxygen injection nozzle of said burner assembly, a carbonaceous material flow passage in communication with said at least one carbonaceous material injection nozzle of said burner assembly, and an additional oxygen flow passage in communication with said additional oxygen injection nozzle.

4. A method of making steel comprising the steps of:
   (a) charging a steelmaking furnace vessel with a quantity of steel scrap;
   (b) supplying a flow of carbonaceous material and a flow of oxygen to a tip of a straight steelmaking lance barrel having a central axis;
   (c) discharging substantially parallel to and substantially coaxially with said central axis of said barrel a combined flow of carbonaceous material and oxygen from a burner assembly provided in said tip, and igniting said combined flow to produce a focused flame operable to preheat and cut said quantity of steel scrap;
   (d) using the flame produced in step (c) to heat said quantity of scrap;
   (e) extinguishing the flame produced in step (d) upon heating said quantity of scrap to a desired degree;
   (f) inserting said lance barrel into said steelmaking furnace vessel a distance sufficient to dispose said tip in a central region of said steelmaking furnace vessel; and
   (g) supplying at least one flow of oxygen to said tip and discharging said at least one flow of oxygen from said tip to refine molten steel within said steelmaking furnace vessel.

5. The method of claim 4 further comprising the step of:
   (h) supplying a flow of carbonaceous material to said tip and discharging said flow of carbonaceous material from said tip such that said flow of carbonaceous material does not intersect said at least one flow of oxygen.

* * * * *